(No Model.) 2 Sheets—Sheet 2.
R. KENT.
APPARATUS FOR SOLDERING SHEET METAL CANS.
No. 249,244. Patented Nov. 8, 1881.
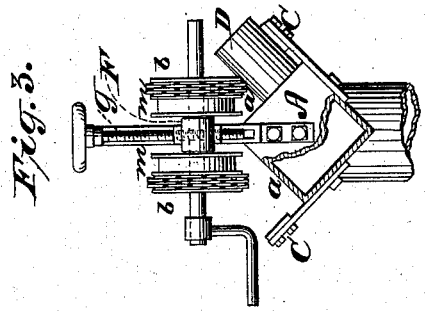
WITNESSES.
H. F. Parker
H. Wells Jr.
INVENTOR.
Robert Kent
per James A. Whitney
Atty.

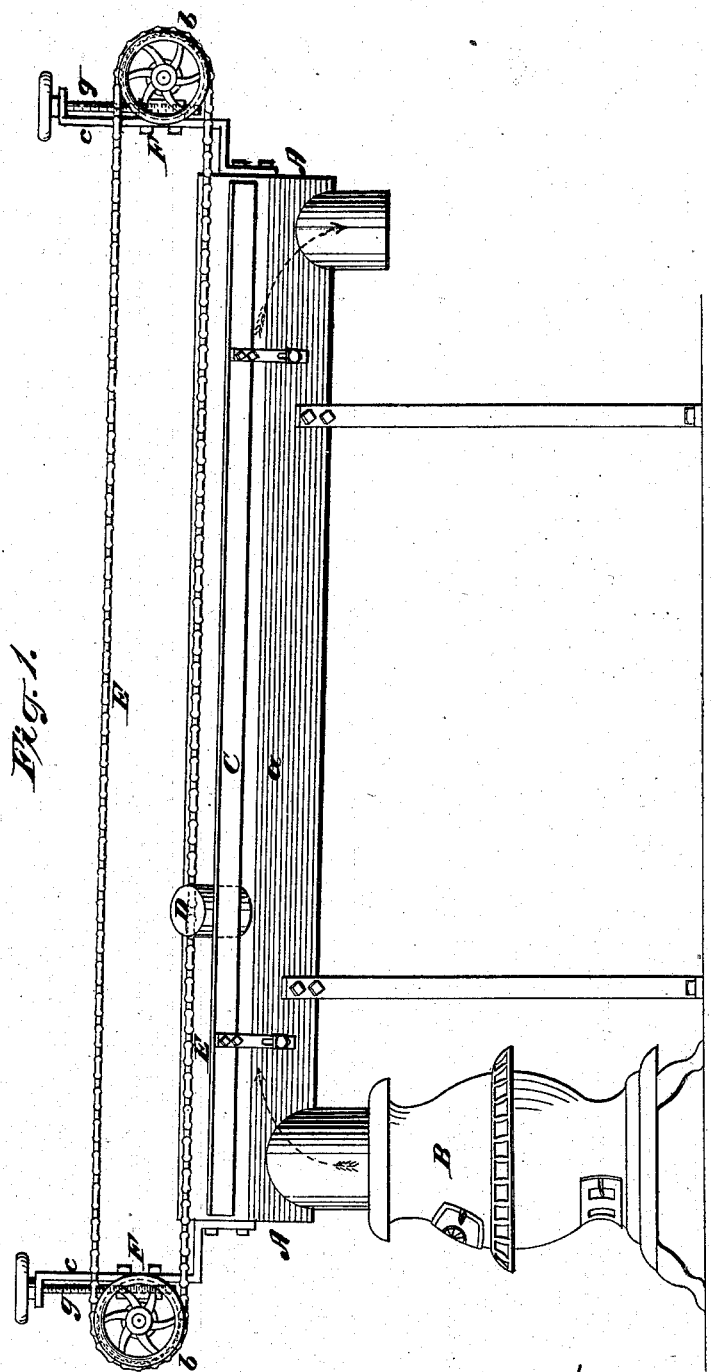

UNITED STATES PATENT OFFICE.

ROBERT KENT, OF BROOKLYN, NEW YORK.

APPARATUS FOR SOLDERING SHEET-METAL CANS.

SPECIFICATION forming part of Letters Patent No. 249,244, dated November 8, 1881.

Application filed May 17, 1880. (No model.)

*To all whom it may concern:*

Be it known that I, ROBERT KENT, of Brooklyn, in the county of Kings and State of New York, have invented certain Improvements in Apparatus for Soldering Sheet-Metal Cans, of which the following is a specification.

In the use of this invention a sufficient quantity of solder is placed within the can to be soldered, and the can itself is rotated in contact with a heated surface in such a manner that the solder is melted and caused to flow along the joint to effectually seal and close the same.

The invention consists in certain novel combinations of parts, whereby the process aforesaid may be carried into practice with very great facility and effectiveness.

Figure 1 is a side view, Fig. 2 is a plan view, and Fig. 3 is a vertical transverse sectional view, of an apparatus embracing my said invention.

A is a heater, which may be rectangular in its cross-section, and which, in order to secure the greatest working capacity in the machine, should have duplicate heating-faces $a$ at right angles to each other, as more fully shown in Fig. 3. This heater is placed in a horizontal position, as represented in Figs. 1 and 2, and consists substantially of a hollow trunk, through which are passed the hot gaseous products of combination from a stove or furnace, B, as indicated by the arrows in Fig. 1. The heater, however, may be heated to the requisite degree by any other appropriate means—as, for example, by a row of gas-jets, or by a furnace applied underneath.

Extended along each side of the heater, and in a plane at right angles to the adjacent face $a$ thereof, is a longitudinal guide or rest, C. These rests C are so arranged that when the cans, as shown at D in Fig. 3, are laid thereon, the ends—*i. e.*, the bottoms of the cans—will rest upon the faces $a$. A sufficient quantity of grain solder being first placed in each can, the contact of the bottom of the can with the heated face $a$ heats and melts the solder, so that by rolling the can from one end to the other of the face $a$ and its adjacent guide or rest C the molten solder will be flowed into the joint between the bottom and sides of the can, and, being flowed throughout the entire circumference of the said bottom, will effectually solder the joint and attach the bottom in place.

In order to give the requisite rolling movement to the cans, there is placed over each of the faces $a$ an endless belt, E, which is preferably composed of a chain, as indicated in the drawings. Each of these endless belts is supported by pulleys $b$, and by any suitable means receives a revolving or rotary movement. The under side of each belt E runs parallel with the face $a$ below, in such a manner as to be brought in contact with the can or cans on said face, the movement of the belt upon the upper sides of the cans rolling the latter over to cause the flow of the solder into the joint of each can, as hereinbefore explained.

In order that the belts may be shifted or adjusted at a greater or less distance from the faces $a$, according as the apparatus is to be used for cans of greater or less diameter, the journals of the pulleys $b$ are formed or provided in vertically-adjustable blocks F, which are situated in guides $c$, which latter have at top fixed nuts $f$, through which are passed screws $g$, to the lower ends of which the blocks F are suspended, so that by working the screws the blocks, and consequently the pulleys $b$, may be raised or lowered to bring the undermost sides of the belts to any desired distance from the faces $a$. To afford changes beyond the limits afforded by the movement of the blocks F, the shafts of the pulleys $b$ may also carry pulleys $m$, of smaller diameter, to which suitably-arranged belts may be applied in lieu of those on the pulleys $b$.

It is to be observed that the function of the duplicate faces $a\ a$ and their adjuncts is to double the working capacity of the apparatus, as compared with what it would be if but one face $a$ were used.

What I claim as my invention is—

1. The combination of the hollow or tubular heater A, having duplicate faces $a\ a$, the duplicate rests or guides C, and the duplicate endless belts E E, the duplicate faces $a\ a$ being heated by the same agency, all substantially as and for the purpose herein set forth.

2. The combination of the adjustable blocks F F, guides $c\ c$, pulleys $b\ b\ b\ b$, endless belts E E, rests or guides C C, and the heater A, having the duplicate faces $a\ a$, the whole arranged to constitute an organized machine, substantially as and for the purpose herein set forth.

ROBERT KENT.

Witnesses:
H. F. PARKER,
H. WELLS, Jr.